US010275819B1

(12) United States Patent
Johnson et al.

(10) Patent No.: US 10,275,819 B1
(45) Date of Patent: Apr. 30, 2019

(54) REDUCING INCOMPATIBLE PAIRINGS

(71) Applicant: Amazon Technologies, Inc., Seattle, WA (US)

(72) Inventors: Joseph Edwin Johnson, Seattle, WA (US); Mohamed Mostafa Ibrahim Elshenawy, Bellevue, WA (US); Shiblee Imtiaz Hasan, Seattle, WA (US); Nathan Eugene Masters, Redmond, WA (US); JaeHa Oh, Seattle, WA (US); Benjamin Schwartz, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 945 days.

(21) Appl. No.: 14/711,644

(22) Filed: May 13, 2015

(51) Int. Cl.
*G06Q 30/00* (2012.01)
*G06Q 30/06* (2012.01)
*G06F 17/30* (2006.01)
*G06N 99/00* (2019.01)
*G06N 7/00* (2006.01)

(52) U.S. Cl.
CPC ..... *G06Q 30/0631* (2013.01); *G06F 17/3053* (2013.01); *G06N 7/005* (2013.01); *G06N 99/005* (2013.01)

(58) Field of Classification Search
CPC .................................................. G06F 17/3053
See application file for complete search history.

(56) References Cited

U.S. PATENT DOCUMENTS

| 8,781,231 | B1* | 7/2014 | Kumar ................. G06K 9/6224 382/159 |
| 8,983,941 | B1* | 3/2015 | Murphy-Chutorian ..................... G06K 9/46 707/723 |
| 9,471,606 | B1* | 10/2016 | Pedregal .......... G06F 17/30386 |
| 2007/0159984 | A1* | 7/2007 | Hentschke .............. H04L 45/00 370/254 |
| 2011/0040619 | A1* | 2/2011 | Jebara ................ G06Q 30/0241 705/14.46 |

(Continued)

OTHER PUBLICATIONS

Barry A. Roberts, "Multistrategy machine-learning vision system," Proc. SPIE 1838, 21st AIPR Workshop on Interdisciplinary Computer Vision: An Exploration of Diverse Applications, (Apr. 13, 1993); (Year: 1993).*

*Primary Examiner* — Marissa Thein
*Assistant Examiner* — Michelle T Kringen
(74) *Attorney, Agent, or Firm* — Lee & Hayes, P.C.

(57) ABSTRACT

Incompatible item pairings may be eliminated or at least reduced when multiple items are presented. A pairwise approach is taken to train a machine learning model to return an incompatibility score for any given pair of items, which indicates a degree of incompatibility between the pair of items. Once trained, the machine learning model may be used to determine an incompatibility score for each unique pairing of items in a set of multiple items. In some embodiments, a graph is generated having nodes that correspond to the multiple items and undirected edges between pairs of the nodes. Scores are generated for each edge of the graph, a minimum spanning tree in the graph is determined, and the items are ranked based at least in part on the minimum spanning tree so that the items can be presented according to the ranking.

20 Claims, 7 Drawing Sheets

(56) References Cited

U.S. PATENT DOCUMENTS

| | | | |
|---|---|---|---|
| 2013/0132402 A1* | 5/2013 | Yang | G06F 17/30256 |
| | | | 707/748 |
| 2013/0142418 A1* | 6/2013 | van Zwol | G06K 9/00751 |
| | | | 382/159 |
| 2016/0292272 A1* | 10/2016 | O'Driscoll | G06F 17/30115 |
| 2017/0322908 A1* | 11/2017 | Nl | G06F 17/30719 |

\* cited by examiner

US 10,275,819 B1

REDUCING INCOMPATIBLE PAIRINGS

BACKGROUND

A service provider may cause multiple items to be simultaneously presented to consumers. Often, such presentation occurs when a consumer accesses a website or a mobile application of the service provider in order to view items, or when the consumer receives the multiple items via another distribution channel, such as electronic mail (e-mail). For example, a deal provider that operates an electronic marketplace for deals may present a list of deals on a webpage.

In any given screen rendering of the webpage, multiple deals may be presented on a single screen rendering, each deal being associated with one or more corresponding items. Such a listing of items may be organized or sorted in various ways, and the manner in which the items are organized/sorted can influence how customers react (i.e., what they click on). In other words, a website may receive more engagement from consumers when a list of items is presented in one way versus another way.

Furthermore, two consecutive items in the list may be regarded as "incompatible" when they are paired together (i.e., when they are presented adjacent to one another, or in close proximity to one another, on a display). For example, a screen rendering may present a first deal for a discount on food/beverages at a restaurant adjacent to a second deal for a discount on a toe fungus removal product. In this illustrative example, it may be undesirable to present the first deal next to the second deal because the two deals may be regarded as "incompatible" when they are paired together due to the fact that many consumers are repulsed by viewing a toe-fungus-removal item next to a food-related item. When consumers are presented with such incompatible item pairings, they can be "turned off" from the service in general (thereby causing consumers to not click on or acquire any of the deals) and/or lose trust in the business providing the services. Thus, new technology that introduces better ways of presenting items to consumers is needed.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
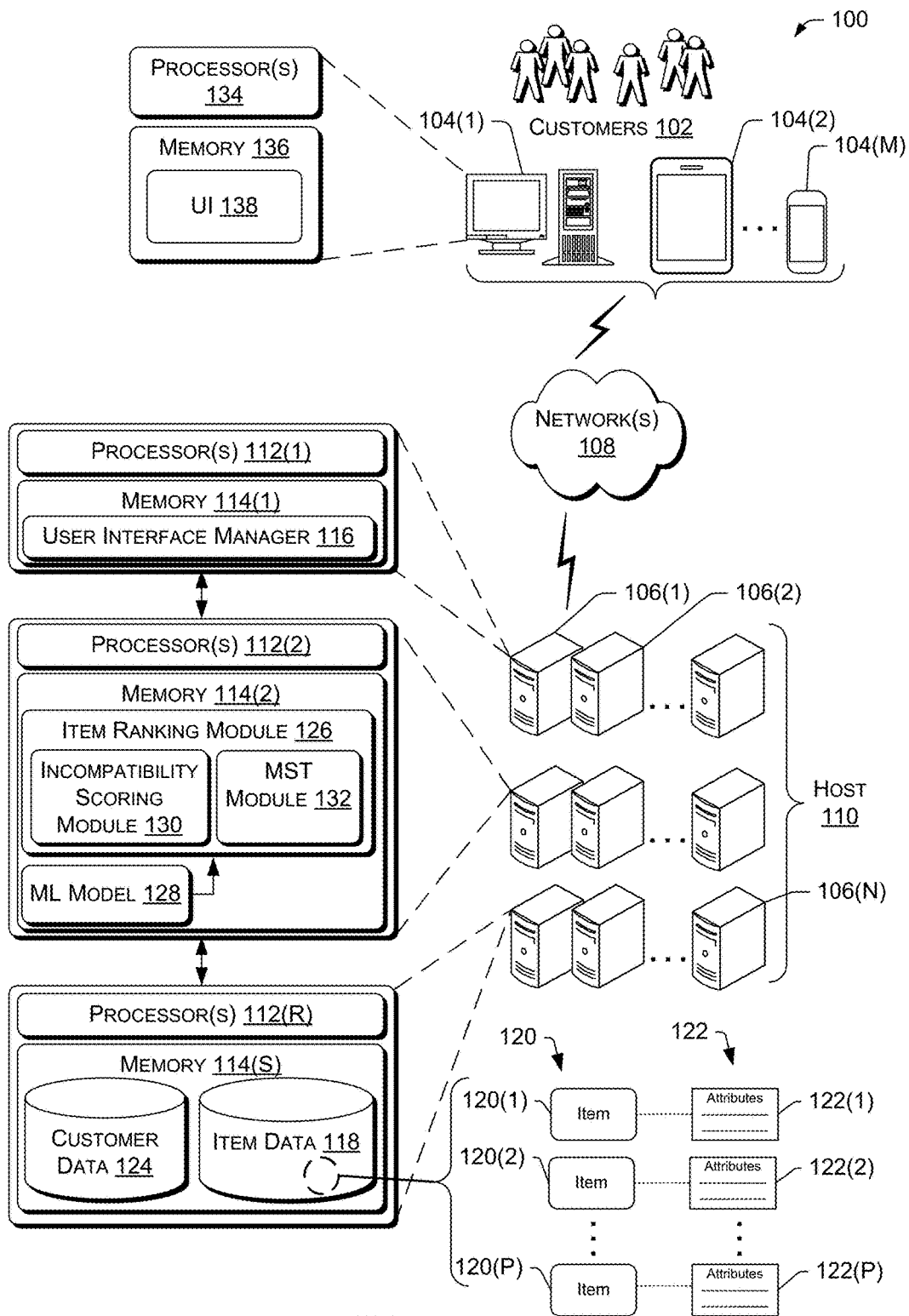
FIG. 1 illustrates an example environment for implementing item ranking that eliminates, or at least reduces an occurrence of, incompatible item pairings.

Any two items may or may not be incompatible when they are paired together. In the context of digital media, items can be considered as being "paired together" when digital representations of the two items are presented next to (e.g., adjacent, above/below, in proximity to, etc.) each other. In some cases, this may include simultaneously presenting two items on a single screen rendering. In other cases, items may be considered "paired together" when they are presented sequentially via an output device (e.g., a display, speakers, etc.).

Furthermore, various criteria may be used to determine whether two items are "incompatible" when paired together. In some cases, an item pairing may be considered "gross" to the average consumer. For example, when a discounted offer (e.g., a deal, coupon, etc.) for a sandwich at a deli (i.e., a food item) is presented next to a discounted offer for toe fungus removal (or any similar item that is considered "gross" to the average person), the average consumer may consider the item pairing to be a gross pairing. In other cases, two items, when paired together, may be incompatible in other ways, such as when a deal relating to guns is paired with a deal relating to children's toys. As another example, a deal for an alcoholic beverage that is paired with a deal for a prenatal massage may be considered an incompatible item pairing. Thus, an "incompatible item pairing" may comprise any two items that, together, are considered unfitting, unsuitable, disagreeable, and/or otherwise improper, and that likely would not be used and/or acquired when paired together.

Embodiments of the present disclosure are directed to, among other things, techniques and systems for eliminating, or at least reducing an occurrence of, incompatible item pairings when multiple items are presented to a customer. A pairwise approach is taken in order to train a machine learning model and/or algorithm to return an "incompatibility score" for any given pairing of items that quantifies incompatibility between any two items. The higher the incompatibility score, the greater the degree of "incompatibility" of an item pairing. Once trained, the machine learning model/algorithm may be used by a machine learning classifier to determine an "incompatibility score" for each unique pairing of items in a set of multiple items. These incompatibility scores may be used in an algorithm that is configured to separate those items that are considered "incompatible" with each other so that incompatible item pairings are eliminated when the multiple items are ultimately presented to a customer. In other embodiments, although incompatible pairings may not be eliminated entirely, the incompatibility scores may be used to at least reduce a likelihood of, or reduce an occurrence of, incompatible pairings.

In some embodiments, a process of ranking items in a manner that eliminates or at least reduces an occurrence of incompatible item pairings includes assigning each item of a plurality of items to a node in a graph. The graph may comprise an undirected graph having an undirected edge between each unique pair of nodes in the graph (i.e., a clique). A machine learning model may then be used to generate incompatibility scores for individual undirected edges of the graph to indicate a degree of incompatibility between respective pairs of items associated with nodes that are connected by the individual undirected edges. The process may further include determining a minimum spanning tree in the graph based at least in part on the incompatibility scores, ranking the items based at least in part on the minimum spanning tree, and causing presentation of the plurality of items based at least in part on the ranking.

By leveraging machine-learned incompatibility scores with a minimum spanning tree algorithm, paths to incompatible item pairings will be avoided, where possible, so that incompatible item pairings are eliminated or at least reduced in the resulting ranked order. Consequently, when the items are ultimately presented in the ranked order, a customer will not view incompatible item pairings (or there will be a decreased likelihood that the customer will view incompatible pairings), which may, in turn, improve the customer's browsing and/or searching experience. It is to be appreciated that multiple different options/orderings exist for consideration in the arrangement of multiple items to eliminate or reduce incompatible item pairings. This is considered to be an "NP-complete" problem that is intractable for determining the most optimal solution. The techniques described herein are directed to approximation algorithms that are configured to minimize an overall "pairing penalty" based at least in part on the machine learned incompatibility scores for each unique item pairing. The techniques described herein also preserve, as much as possible, the relevance of items that are presented to a consumer. That is, notwithstanding incompatibility between items, items may be ordered for presentation according to known customer preferences and/or relevance to an original search query that was received from the consumer. Accordingly, the techniques and systems described herein work to preserve as much of the original "relevance" ranking as possible while also eliminating, or at least reducing an occurrence of, incompatible item pairings.

The techniques described herein may be implemented in a number of ways. Example implementations are provided below with reference to the following figures. It is to be appreciated that, although the examples described herein are presented predominantly in the context of items that are presented in an electronic marketplace in the form of deals, the described techniques and systems may be used to solve a variety of types of decision problems that are considered to be "NP-complete" problems. Thus, the presentation and arrangement of any items, whether the items are digital items, physical items, or otherwise, may benefit from the techniques and systems disclosed herein to eliminate or reduce incompatible item pairings. As such, the techniques and systems described herein may be implemented in any suitable context involving various types of items.

FIG. 1 illustrates an example environment 100 for implementing item ranking that eliminates or at least reduces the occurrence of incompatible item pairings. In the environment 100, customers 102 may utilize client computing devices 104(1), 104(2), . . . , 104(M) (collectively 104) to access one or more servers 106(1), . . . , 106(N) (collectively 106) of an electronic commerce (e-commerce) system via a network(s) 108. The terms "users," "consumers," "customers," or "subscribers" may be used interchangeably herein to refer to the customers 102. The client computing devices 104 (sometimes referred to herein as "client devices 104") may be implemented as any number of computing devices, including a personal computer, a laptop computer, a desktop computer, a portable digital assistant (PDA), a mobile phone, a set-top box, a game console, a voice-controlled speaker assistant device, a smart television, a wearable device (e.g., a smart watch, electronic "smart" glasses, a fitness tracker, etc.), and/or any other electronic device that can transmit/receive data over the network(s) 108.

Furthermore, the network(s) 108 is representative of many different types of networks, and may include wired and/or wireless networks that enable communications between the various entities in the environment 100. In some embodiments, the network(s) 108 may include cable networks, the Internet, local area networks (LANs), wide area networks (WAN), mobile telephone networks (MTNs), and other types of networks, possibly used in conjunction with one another, to facilitate communication between the server(s) 106 and the client devices 104. Although embodiments are described in the context of a web based system, other types of client/server-based communications and associated application logic could be used.

The server(s) 106, which may be arranged in a cluster or as a server farm comprising one or more fleets of servers 106, may be maintained and/or operated by a host 110 (e.g., an online retailer) of an electronic marketplace, which may be provided via a site (e.g., a website) or another type of information distribution platform with additional types of distribution channels (e.g., electronic mail (e-mail), mobile applications, etc.), and so on. The components and modules executing on the server(s) 106 may reside on the same physical server(s) 106, or may be segregated physically and/or logically into separate layers with trust boundaries in between the layers. Separate layers may be communicatively coupled for transmitting signals and data therebetween under suitable security protocols. The server(s) 106 are capable of handling requests from many client devices 104 and serving, in response, various information (e.g., web pages, application user interfaces, etc.) that can be rendered on displays of the client devices 104. The host 110 can be any type of entity that hosts a portal (e.g., a storefront) that allows customers 102 to view items that are available from the electronic marketplace. For example, the host 110 may represent a host of any type of site allowing for browsing of, and searching for, items in a repository of items, such as sites including, without limitation, merchandising sites, deal sites, group buying sites, informational sites, social networking sites, blog sites, search engine sites, news and entertainment sites, and so forth.

In some implementations, the host 110 operates a deal website that hosts a repository of deals that are available to the consumers 102 for purchase. For the purposes of this discussion, the host 110 may offer deals on behalf of itself, merchants, and/or a deal sourcer. In various embodiments, a deal sourcer may include any entity that aggregates deals from any number of merchants and provides those deals to an entity, such as the host 110, which may then offer those deals to consumers 102. Furthermore, deals may represent some form of value to be applied when items are acquired by individuals in association with the deals, such as a discount, a credit, a rebate, and the like. Deals may also represent an offer and/or promotion to acquire one or more items associated with the deals or may represent one or more advertisements associated with the deals. Deals may also be offered at any price point, including being offered at no cost, such as consumers 102 being offered a deal that includes an item at no additional cost to the consumer 102. The items offered in association with deals may include tangible items, intangible items, products, goods, services, a bundle of items, digital goods or services that are downloaded or streamed (e.g., media clips), sellable units, events, or anything else which might be consumed, purchased, rented, subscribed to, leased, loaned or viewed (hereinafter "acquired") physically, digitally or otherwise via a payment transaction.

In various embodiments, previously acquired deals may be redeemed when the deals are actually acquired or at a later time. Provided that a particular deal is redeemed at a later time, a consumer 102 that acquired the deal may provide a code to redeem the deal, where the code may have been provided to the consumer 102 when the deal was acquired. The code may take any form (e.g., numbers, letters, symbols, combinations thereof, etc.) and may be provided to the merchant associated with the deal or may be used to redeem the deal in any manner. For example, a particular consumer 102 may redeem the deal by physically providing the code to a merchant (e.g., via a physical medium), by presenting the code via a user device, by swiping a card (e.g., a credit card, card associated with a merchant, etc.), etc. In addition, deals may be paid for when they are acquired or at a subsequent time, such as, for example, when a consumer redeems the deal at the merchant.

Furthermore, the items provided by merchants and then offered by the host 110 may be acquired by consumers 102 via one or more physical locations, via one or more sites (e.g., a site of the merchant, a host site, websites, etc.), via any type of user device, at the point of transaction or interaction with a merchant, or combinations thereof. The merchants and/or the host 110 may also provide items acquired by individuals to locations specified by the individuals, such as via mobile services, delivery, etc. In addition, the acquisition of items from merchants by individuals via the host 110 may be achieved through various means of providing value for the items, such as purchasing items, renting items, leasing items, borrowing items, trading items, bartering items, etc. Moreover, deals may be available to consumers 102 for a limited period of time and, once acquired, the deals may or may not have to be redeemed within a predetermined amount of time.

In FIG. 1, the server(s) 106 are shown as being equipped with one or more processors 112(1), 112(2), ..., 112(R) (collectively 112) and one or more forms of computer-readable memory 114(1), 114(2), ..., 114(S) (collectively 114). Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, compact disc read-only memories (CD-ROMs), digital video discs (DVDs), read-only memories (ROMs), random access memories (RAMs), erasable programmable read-only memories (EPROMs), electrically erasable programmable read-only memories (EEPROMs), flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by an Internet download.

The computer-readable memory 114 may be used to store any number of functional, or executable, components, such as programs and program modules that are executable on the processor(s) 112 to be run as software. Each component stored in the computer-readable memory 114 may comprise computer-executable instructions that, when executed, cause the one or more processors 112 to perform acts and to implement techniques described herein. Each component may be in the form of data structures, program modules, or other data. The components included in the computer-readable memory 114 may include a user interface (UI) manager 116 to facilitate the presentation of items to the customers 102. The UI manager 116 may execute on a first layer or first fleet of servers 106, which may correspond to a web server(s), and which may be communicatively coupled to the other layers/fleets shown in FIG. 1 over a trust boundary. Often, the customer 102, upon logging into a site of the host 110, is able to browse a repository of deals that are each associated with one or more items, and the customer 102 may also search for deals and items in the repository.

Accordingly, the UI manager 116 may access item data 118 in order to retrieve items 120(1), 120(2), ..., 120(P) (collectively 120) that are to be presented to a customer 102. The item data 118 may be accessible, directly or indirectly, by the server(s) 106. In addition, each of the items 120 may have respective item attributes 122(1), 122(2), ..., 122(P) (collectively 122) including information related to the items 120, such as, without limitation, textual descriptions, images, image attributes (e.g., histograms, recognized objects, etc.), one or more deals that are associated with the items 120, metadata (e.g., tags, identifiers, etc.), item quantities (e.g., inventory), transaction data associated with the items 120 (e.g., gross sale data, frequency of purchase, etc.), and so on. The server(s) 106 may further include customer data 124 that provides information about the customers 102, such as customer account information, demographics (e.g., age, languages spoken, work experience, educational history, interests, gender, hobbies or preferences, location, and the like), and other information associated with the customer 102. As shown in FIG. 1, the item data 118 and the customer data 124 may be maintained in its own layer or fleet of servers 106 to be accessed by components in other layers/fleets shown in FIG. 1.

FIG. 1 also depicts an additional layer or fleet of servers 106 that includes an item ranking module 126 configured to rank the items 120, or subsets thereof, based at least in part on a machine learning model 128 that is trained to return "incompatibility scores" for item pairings. The "incompatibility score" returned by the machine learning model 128 for any given pairing of items is a means to quantify the degree (or level) of incompatibility (or compatibility) between any two items. In some implementations, a higher incompatibility score corresponds to a greater degree of "incompatibility" between two items that are paired together. Because "incompatibility" is a somewhat subjective metric on which item pairings can be scored/evaluated, the machine learning model 128 may be built using human-labeled training data that indicates item pairings and the degree to which those item pairings are deemed incompatible. In this manner, the machine learning model 128 may be trained to process various inputs and signals to return appropriate incompatibility scores for various item pairings. For example, the machine learning model 128 may be configured to return a relatively high incompatibility score for a pairing of a food-related item with an item relating to "toe fungus removal."

As an alternative to using a machine learning approach, the item ranking module 126 may be further configured to re-order items 120 using hard constraints and/or heuristics, such as filtering or sorting based on categories. For example, predefined hard constraints may be implemented where food-related items 120 are separated from medical-related items 120, based on the notion that at least some medical related items 120 may be incompatible when paired with food-related items 120.

In various embodiments, the machine learning model 128 may be built and implemented using any suitable machine learning technique, such as a tree-based model, support vector machines, kernel methods, neural networks, random forests, splines (e.g., multivariate adaptive regression splines), Bayesian networks, naïve Bayes probabilities, a feed forward neural net, expectation maximization, genetic algorithms, a hidden Markov model (HMM), a Kalman filter (or enhanced Kalman filter), linear perceptron, linear regression algorithms, nonlinear regression algorithms, or an ensemble of one or more of the aforementioned techniques. It is to be appreciated that the machine learning model 128 may represent a single or multiple machine learning models 128.

FIG. 1 illustrates that the item ranking module 126 may include an incompatibility scoring module 130 configured to generate an incompatibility score associated with any given pair of items 120 using the machine learning model 128. The incompatibility scores generated by the incompatibility scoring module 130 may be associated with corresponding item pairings in any suitable manner. In some embodiments, an undirected graph may be constructed, the graph comprising a plurality of nodes and edges that connect the plurality of nodes. The nodes may correspond to the items 120 that are to be ranked, and the graph may include an undirected edge between each unique pair of nodes, which forms a clique, or a "complete" graph. Accordingly, an incompatibility score may be assigned to individual edges of the undirected graph to indicate the level of incompatibility for the pair of nodes (i.e., the corresponding pair of items 120) that are connected by the particular edge. In other embodiments, the system may not generate a graph and may generate incompatibility scores for individual pairs of items 120 and associated the scores therewith in another type of data structure or representation.

The item ranking module 126 may further include a minimum spanning tree (MST) module 132 configured to find a minimum spanning tree (which may be non-unique) in the graph representation of the plurality of items 120 to be ranked. The MST module 132 may execute any suitable MST algorithm to determine a minimum spanning tree, including, without limitation, Prim's MST algorithm, Dijkstra's shortest path tree algorithm, Boruvka's MST algorithm, and so on. The minimum spanning tree determined by the MST module 132 can be computed in polynomial time, and represents the minimum overall score given multiple evaluated "in order" traversals of the graph that visits each node. As such, the minimum spanning tree may comprise the minimum of the overall scores among multiple traversals of the graph. The item ranking module 126 may use the ordering of the nodes in the minimum spanning tree as a ranking for the plurality of items 120. By leveraging machine-learned incompatibility scores with a MST algorithm, paths to incompatible item pairings will be avoided, where possible, so that incompatible item pairings are eliminated or are at least reduced in the resulting ranked order. Consequently, when the items 120 are ultimately presented in the ranked order, a customer 102 will not view incompatible item pairings, which may, in turn, improve the customer's browsing and/or searching experience and may reinforce the customer's trust in the host 110. In some embodiments, the MST module 132 may be configured to determine an order of a plurality of items 120 that minimizes the sum of the incompatibility scores associated with sequential pairs of the items in the ordered list without operating on a graph, such as when incompatibility scores are associated with individual pairs of items 120 using a non-graph representation of the same data.

In addition to ranking the items 120 to eliminate, or at least reduce the occurrence of, incompatible item pairings, the item ranking module 126 may be further configured to rank the items 120 based on one or more additional metrics, such as relevance of the items 120 to a received search query, relevance of the items 120 to known preferences of the customer 102 (e.g., item category preferences, dollar amount preferences, etc.), and so on. The item ranking module 126 may utilize the machine learning module 128 for optimizing these additional metrics as well. Accordingly, additional scores may be associated with the undirected edges of the graph representation of the items 120 to be ranked. In this scenario, each undirected edge is ultimately assigned a score or value that can be based in part on the incompatibility score from the incompatibility scoring module 130 and/or based in part on another score, such as an original relevance score. In any case, the MST module 132 may execute on the scores assigned to the edges of the graph representation of the plurality of items, and the item ranking module 126 may rank the items 120 such that incompatible item pairings are eliminated or at least reduced in the ranked list of items 120 while the list of items 120 is still presented in an order that optimizes other metrics, such as relevance metrics. As a result, the most relevant items are still presented to the customer 102 even though incompatible item pairings have been eliminated or at least reduced.

The UI manager 116 may be configured to cause presentation (e.g., display), or otherwise communicate a plurality of items 120 in the ranked order output by the item ranking module 126. For example, the UI manager 116 may display a ranked list of items 120 on a search results page, an item catalogue browsing page, and so on. The customer 102 may utilize an associated client devices 104 when viewing the items 120 presented via the UI manager 116. As illustrated, each client device 104 is equipped with one or more processors 134 and one or more forms of computer-readable memory 136, which may represent any of the types of memories described above with reference to the processor(s) 112 and the memory 114 of the server(s) 106. The memory 136 may store various applications and data, including, without limitation, a user interface (UI) application 138 executable on the processor(s) 134 to provide a user interface, such as a graphical user interface (GUI) on the display of the client device 104. In some implementations, the UI application 138 may comprise a browser application that is configured to present information from accessing a website, such as a deal site of the host 110. Accordingly, the UI application 138 may render web pages served by servers 106 on an associated display.

Although various components, modules, and data of FIG. 1 are shown under the host servers 106 and distributed across multiple layers or fleets of servers 106 with trust boundaries therebetween, the components, modules, and data shown in FIG. 1 may be collocated physically and/or logically, spread or distributed across multiple machines and/or fleets of servers 106 in various locations, with any suitable trust boundaries implemented as appropriate. Thus, the configuration is adaptable for the specific implementation desired.

Figure 2:
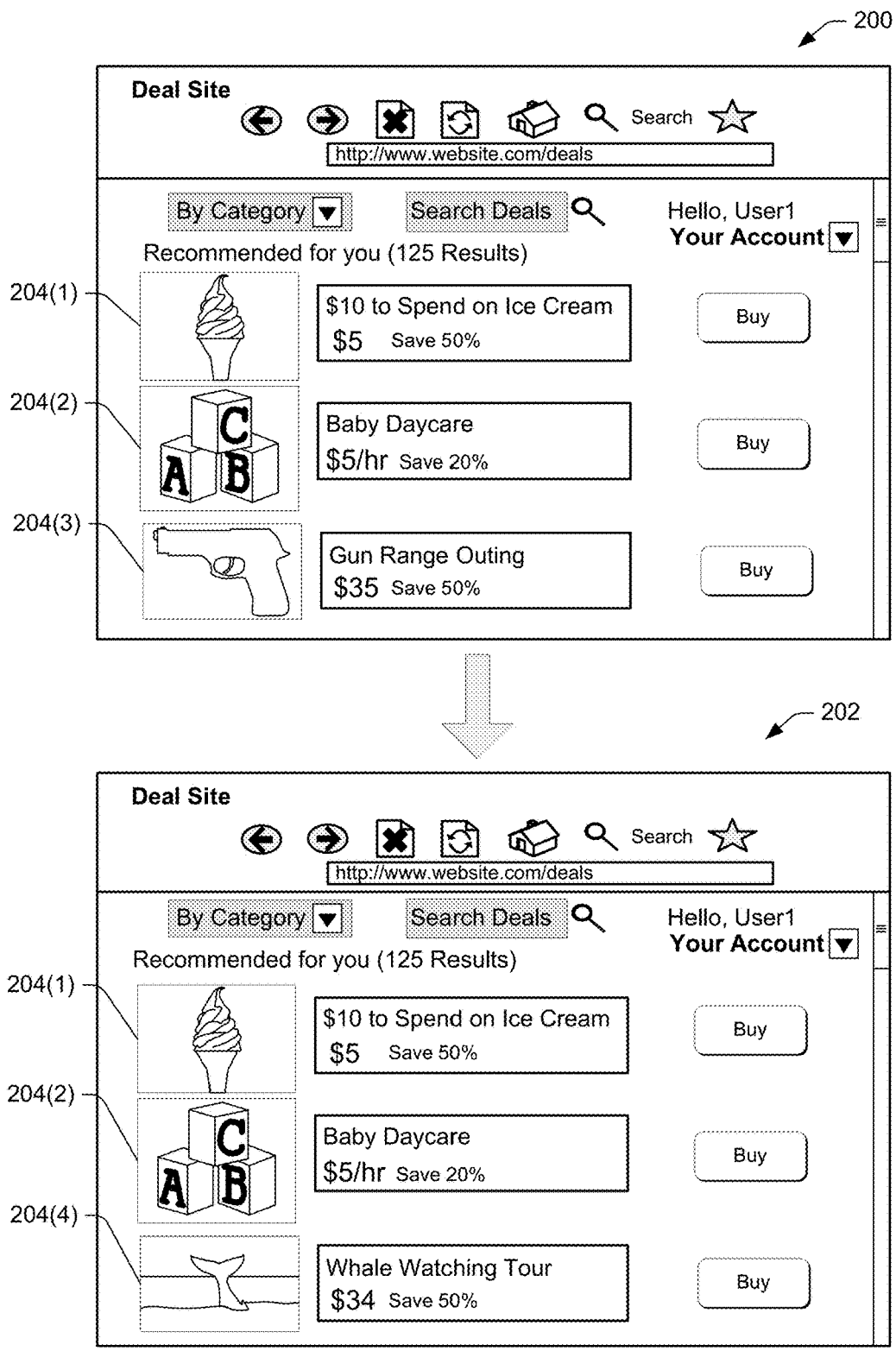
FIG. 2 illustrates example screen renderings of user interfaces to provide a ranked list of items.

FIG. 2 illustrates example screen renderings of user interfaces to provide a ranked list of items. A first user interface 200 is representative of a user interface before eliminating or reducing incompatible item pairings, and a second user interface 202 is representative of a user interface after eliminating or reducing incompatible item pairings. Both user interfaces 200 and 202 illustrate how deals 204 (and the items 120 associated therewith) may be presented simultaneously in a single screen rendering. In the example of FIG. 2, the deal 204(1) is associated with ice cream, which is a tangible item that may be purchased at a retail establishment that sells ice cream. Meanwhile, deal 204(2) is associated with a baby daycare service, deal 204(3) is associated with a gun range service, and deal 204(4) is associated with a whale watching tour service.

User interfaces 200 and 202 show an exemplary manner in which items 120 may be "paired together" in the context of digital media. For example, the gun-related item associated with the deal 204(3) may be considered as being "paired together" with the baby-related item associated with the deal 204(2) because the two items are presented adjacent to each other in the user interface 200. In the user interface 200, each item associated with the deals 204(1)-(3) may be considered as being paired together with another item in the user interface 200 by virtue of all three items being viewable in a single screen rendering. This is in contrast to deals that may be "below the fold," or otherwise off-screen and viewable only if the user 102 scrolls down in the user interface 200. It is to be appreciated that any two items 120 may be "paired together" in other ways, such as when two items 120 are presented sequentially (as opposed to simultaneously) on a display (e.g., a slideshow presentation), or sequentially via audio output from one or more speakers, and so on.

Furthermore, in the user interface 200, the items 120 associated with the deals 204(2) and 204(3) may be considered incompatible because the deal 204(3) associated with the gun-related item may be considered unfitting or otherwise improper when paired with the deal 204(2) associated with the baby-related item (i.e., babies and guns don't mix well for the average consumer). Thus, the user interface 200 may represent an item ranking that presents deals 204 that are relevant to a particular customer 102, but the presentation does not leverage the techniques and systems described herein to eliminate or reduce the occurrence of incompatible item pairings, such as the pairing of deals 204(2) and 204(3).

In contrast to the user interface 200, the user interface 202 illustrates how a user interface might look after the techniques and systems described herein are implemented to eliminate or at least reduce the occurrence of incompatible item pairings, such as the pairing of deals 204(2) and 204(3). Specifically, the item ranking module 126 may evaluate a plurality of items 120, including at least those items 120 associated with the deals 204(1)-(4) shown in FIG. 2, and the item ranking module 126 may re-rank the items 120 based on machine-learned incompatibility scores for respective pairs of the items 120 and a minimum spanning tree in a graph representation of the plurality of items 120. This process will be explained in further detail below with respect to the following figures. The effect of the ranked output from the item ranking module 126 is to separate the incompatible items associated with deals 204(2) and 204(3) so that they are no longer considered as being "paired together." For example, the deal 204(3) relating to guns may be "pushed down" the list of deals 204 as part of the re-ranking by the item ranking module 126 so that it is positioned "below the fold" and off of the screen rendering that presents the deal 204(2) for baby daycare services. In FIG. 2, a different deal 204(4) that is associated with an item 120 that is compatible with baby daycare services may replace the position of the deal 204(3) in the ranked order of items/deals. In this example, the deal 204(4) is for a discounted whale watching tour, which is not deemed incompatible with the baby daycare services deal 204(2). Thus, the user interface 202 illustrates an example presentation of multiple items where incompatible item pairings are eliminated or reduced in the ranked list of items 120.

Figure 3:
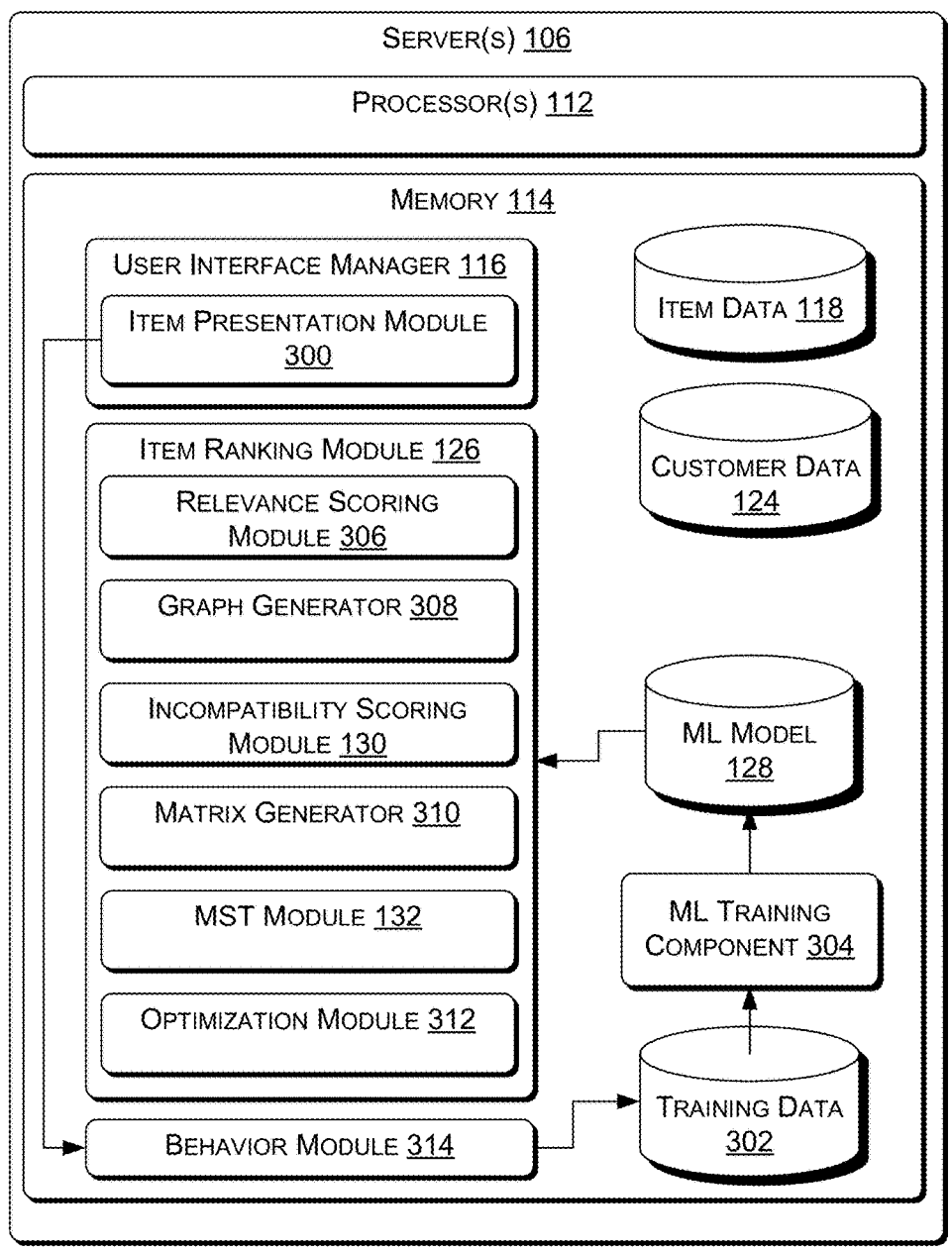
FIG. 3 illustrates a block diagram of an example server(s) and components thereof for implementing item ranking such that incompatible item pairings are eliminated or reduced.

FIG. 3 illustrates a block diagram of an example server(s) 106 and components thereof for implementing item ranking such that incompatible item pairings are eliminated or reduced. The server(s) 106 may be implemented with processing capabilities and memory suitable to store and execute computer-executable instructions, such as the processor(s) 112 and the memory 114 introduced with reference to FIG. 1.

FIG. 3 shows that the UI manager 116 (introduced in FIG. 1) may include an item presentation module 300 configured to manage and present items 120 according to output received from the item ranking module 126. For example, the item presentation module 300 may arrange items 120 in a list for presentation on a display of a client device 104, or via another output component of the client device 104 (e.g., speakers). When multiple items 120 are simultaneously presented on the display of the client device 104, the list of items 120 may be oriented in any manner, such as vertically, horizontally, diagonally, successive rows and/or columns, and so on. In some implementations, the list of items 120 may be presented on a display of a client device 104 such that the customer 102 may scroll through the list to reveal off screen items farther down the list.

As previously discussed, the item ranking module 126 is configured to rank the items 120, or a subset thereof, based at least in part on a machine learning model 128 that is trained to return incompatibility scores for any unique item pairing. The machine learning model 128 may be trained to return other types of outputs as well, such as "relevance scores" for items 120 that are indicative of the items' relevance to known customer preferences, search queries, and so on. FIG. 3 shows that the memory 114 may also include training data 302 that is used by a machine learning training component 304 to train the machine learning model 128. The training data 302 may include at least portions of the item data 118 (e.g., the item attributes 122 introduced with reference to FIG. 1) and the customer data 124, which may be analyzed and labeled in a supervised machine learning approach to create the training data 302. The labels may correspond to incompatibility ratings associated with item pairings that indicate a level of incompatibility between any pairing of items 120. For example, human users may evaluate item pairings and may rate the incompatibility of the two items on any suitable scale (e.g., a scale of 1 to 10, 10 being extremely incompatible and 1 being not incompatible at all (i.e., compatible)). In some embodiments, the training data 302 may be entirely human labeled, or it may be labeled in at least a partially automated fashion in a semi-supervised learning approach.

Because the item attributes 122 included in the training data 302 may include various types or forms of data (e.g., text-based data, image-based data, etc.), the machine learning model 128 may be trained to process any type of input data including, without limitation, textual descriptions associated with items 120, item images, image attributes (e.g., histograms, recognized objects, etc.), metadata (e.g., tags, identifiers, etc.), words, tokens, and other item-related information, such as item categories, and so on.

In some embodiments, the machine learning training component 304 may be configured to train the machine learning model 128 using image-based training data or a combination of both image-based training data and text-based training data. The idea behind using image-based training data is based on the notion that two items 120 may not otherwise be thought of as incompatible together based on an analysis of the text-based data alone, yet the item images that are to be displayed to a customer 102 may be incompatible when the items 120 are paired together. For example, imagine that the deal 204(3) having an image of a gun pointing to the left (shown in FIG. 2) is positioned adjacent to, and to the right of, another deal 204 that relates to a tour of the White House in Washington D.C., where the White House tour deal 204 presents an image of the President of the United States of America. The effective result is a depiction of a gun pointing toward the President on the user's screen. Based solely on the text-based data associated with these two example items 120, one may well determine that these two items 120 are compatible when paired together. However, when pairing the two items 120 in the manner described above with the images positioned relative to each other in a particular orientation, the average consumer 102 may find this item pairing unsettling due to the fact that the gun in the deal 204(3) is pointing directly at the President. In other words, there may not be a recognizable pattern in the textual descriptions of the two aforementioned example deals 204 to indicate the incompatibility of the item pairing. Instead, the incompatibility of the item pairing is tied to the nature and positioning of the images associated with the items 120. Accordingly, computer vision algorithms may be used by the machine learning training component 304 to train the machine learning model 128 for recognizing incompatible item pairings from image-based data.

To accomplish machine learning from image-based data, various computer-vision algorithms may be utilized to analyze image data and recognize and/or categorize features in the analyzed images. In some embodiments, histograms may be applied for color recognition, background segmentation, and/or gesture detection. Histograms of images can provide information regarding the darkness/lightness of an image (e.g., a 0 to 255 histogram, where 0 is darkest and 255 is lightest). In the context of image recognition and feature categorization, histograms can be used as a pre-processing technique for performing background segmentation, such as separating an object (e.g., a hand) in the image from the image background. A sharp threshold in the histogram may be identified by a computer-vision algorithm to distinguish the background from one or more objects in the image foreground. The background segmentation may result in an outline around the object(s) in the image foreground, where the non-object/background pixels are replaced with a known blank value (e.g., pure white). In this manner, objects may be detected and possibly recognized for classification of the images. As another example, histograms may provide information on the distribution of colors in the image to detect whether, for example, the image is an outdoor image (e.g., mostly green and blue colors in the color distribution), or an indoor image (e.g., mostly dark colors in the color distribution). These detected features can be used as an input feature to a machine learning algorithm for determining a classification for a given image.

In some embodiments, edge detection algorithms can be used to detect outlines or patterns for objects in images. Any suitable edge detection operator may be used including, without limitation, Sobel, Laplacian, Canny, Roberts, Prewitt, and the like. Edge detection may utilize first or second derivatives, equivalently, to detect large changes in pixel averages/values over a local region in the image, which can, in turn, be used to determine the presence of an edge. Thus, edge features may be used as another input feature to a machine learning algorithm.

In some embodiments, computer-vision algorithms may be used to recover three-dimensional (3D) information from a two-dimensional (2D) image. For instance, pose and homography estimation can be used to estimate a 3D plane of an object (or scene) based on known information about the camera that formed the image (e.g., focal point, rotation/translation applied to the camera, etc.). This known information can be gathered from sensors (e.g., accelerometer, gyroscope, magnetometer, global positioning system (GPS) receiver, etc.), stereo images (images taken from multiple cameras at different perspectives), and so on. A homography matrix can be determined, and the 3D plane can be recovered to, among other things, infer 3D information about objects in the scene, which can also be used as a machine learning algorithm input feature.

3D perspective geometry is another example technique that can be used for recovery of 3D information. For instance, some scenes provide information that can be used to estimate a 3D plane, as well as a size or depth of an object using context cues from the scene. A common example for this scenario is an image having railroad tracks that disappear into the distance (into a vanishing point). Edge detection and Hough transformation of the image can be used to reconstruct the vanishing point in this example. Points that are located near such lines, when combined with real-world size information (based on a reference marker at a known distance away from the camera or other context cues in the image with known reference information), can then be used to recover 3D position and depth relative to the parallel lines in the image. As such, 3D perspective geometry can be used to derive input features for a machine learning algorithm.

Template matching is another technique for feature detection that uses patterns garnered from edge detection to determine what an object in the image is (i.e., object detection/recognition) based on an outline in the image, or its pattern. Templates comprise samples of known reference objects at multiple translations/rotations/scales, and when compared to an object in an image (e.g., using techniques such as convolution or the related cross-correlation operators), a match may be determined. This type of computationally-intensive technique may be combined with other techniques as a form of boosting (re-enforcing what is known or inferred by comparing the results of multiple examples/classifiers/techniques).

Scale invariant feature transform (SIFT) can be used to detect features in images that change with perspective. This may involves changes in translation, rotation, and scale relative to the camera/observer. SIFT can be used to derive input features for a machine learning algorithm to classify images. Simultaneous localization and mapping (SLAM) is another example technique to construct a 3D/location map with relative location of some reference point, which may be implemented as an additional input feature for machine learning.

Corner detection is yet another example technique used to detect points of interest (e.g., corners, where two major edges intersect, etc.) in an image for feature detection or image categorization. Corner detection may be used to recover a plane of the image and may be based on algorithms including, without limitation, Harris, features from accelerated segment test (FAST), and so on.

Hough transforms (detecting lines, circles, shapes) may be used to transform one feature space to another feature space for feature detection or categorization. For instance, x, y Cartesian space may be transformed into an a, b feature space from the formula y=ax+b for detecting lines (or any arbitrary shape that can be modeled in a similar way).

Various pre-processing techniques may be applied to image data as part of processing image data for feature detection and categorization. For example, color space transformations (e.g., hue-saturation-value (HSV), Cyan-Magenta-Yellow-blacK (CMYK), LUV, etc.) may be used to convert from one color space to another so that color information is preserved while allowing for operations on a single value for particular algorithms (e.g., luminosity). Difference of Gaussians is another pre-processing technique to smooth out regions of the image. This may be done before running edge detection. Histogram equalization is another pre-processing technique that may be used before running a computer vision algorithm for feature detection.

The various types of computer-vision algorithms mentioned above may be applied to image data so that the extracted features from the images can be devolved into text-data and used to train the machine learning model 128 in a similar fashion training machine learning models from image metadata (e.g., text-based image tags). In this manner, any data/features that can be extracted from images using computer-vision techniques can be used to train the machine learning model 128.

In some embodiments, the item ranking module 126 may be configured to identify, via the incompatibility scoring module 130, a pair of items 120 that are incompatible when paired together based solely on the images and suggest a change or modification to the images where appropriate. For example, two items 120 may be associated with images that are incompatible when paired together, yet the items 120 themselves are not otherwise incompatible. Accordingly, if the images were changed so that the images were not incompatible when paired together, the item pairing can be maintained as the item pairing is no longer incompatible with the modified image(s). Accordingly, the image ranking module 126 may identify a pair of items 120 that are associated with those items 120 and may flag the item pairing for verification of compatibility. For flagged item pairings, the item ranking module 126 may, ignoring the item images, verify that the items 120 are indeed compatible (or not incompatible) when paired together. If it can be verified that the item pairing is indeed compatible, ignoring the images, the item ranking module 126 may determine whether a change or modification to one or more of the images associated with the items 120 will result in the item pairing being compatible (or not incompatible). For example, if an alternate image can be substituted for an existing image for one or both of the items 120, and the substitution results in a low, or zero, incompatibility score, the substitution may be suggested as an option for maintaining the item pairing in the final ranked order of the items 120. In some embodiments, the images may be inverted or rotated, or colors adjusted, to accomplish the same or similar result. If the suggested change or modification to the images is accepted by an authorized user, for example, the change or modification may be performed and the incompatibility scores recalculated/regenerated.

Referring again to FIG. 3, the item ranking module 126 may include various sub-modules including, among others, a relevance scoring module 306 to determine relevance scores (or original relevance scores) relating to a plurality of items 120. The relevance scores may be derived from relevance metrics that may order the items 120 according to their relevance to known customer preferences (e.g., item category preferences, price preferences, etc.) so as to rank the items 120 in order of their likely interest to the customer 102. A customer 102 may provide explicit preference feedback via a survey or input mechanism, or preferences may be implicitly learned based on customer behavior, shopping history, or similar data. In some embodiments, the machine learning model 128 may be used to return relevance metrics in association with particular items 120 that correspond to an item's relevance to known customer preferences. For example, a customer 102 may prefer travel-related deals over food-related deals, such that items 120 related to travel-based products/services (e.g., vacation packages) may be ranked higher than other non-travel-based items 120. In some implementations, the relevance score generated by the relevance scoring module 306 may be based on a precision metric for received search queries 102. As such, items 120 may be ranked according to relevance to a received search query (e.g., one or more keywords input into a search query field by the customer 102).

It is recognized that ranking items based solely on the relevance scores generated by the relevance scoring module 306 may result in incompatible item pairings, such as the example shown in the user interface 200 of FIG. 2. Thus, the item ranking module 126 contains additional modules that are configured to modify this original ranking (i.e., re-rank the items 120) in a manner that eliminates, or at least reduces an occurrence of, incompatible item pairings, yet preserves as much of the relevance ranking as possible. The decision problem of finding the optimal solution to re-rank the items 120 so that any incompatible item pairings are eliminated, or reduced to the greatest extent possible, is recognized as being an "NP-complete problem," meaning that the decision problem is in non-deterministic polynomial (NP) time, and is NP-hard, and thus, intractable. To address the NP-complete problem of re-ordering the items 120 in an optimal way, the techniques and systems herein are configured to apply an approximation algorithm to find a solution that, although not the optimal solution, makes the decision problem tractable.

Figure 4:
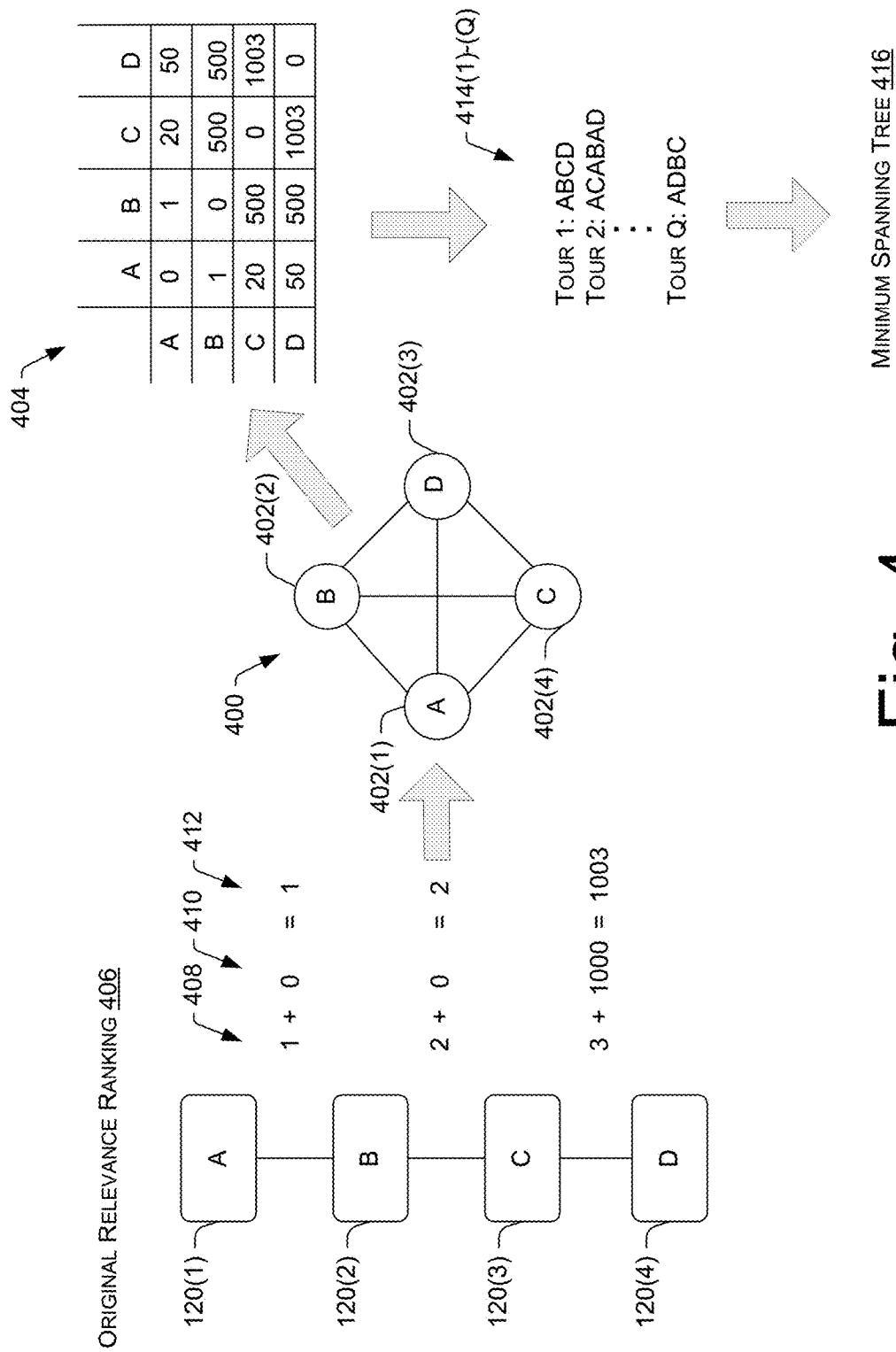
FIG. 4 illustrates a schematic diagram of an example technique for generating a ranked list of items that eliminates, or at least reduces an occurrence of, incompatible item pairings.

Accordingly, FIG. 3 shows that the item ranking module 126 may include a graph generator 308 configured to generate a graph that represents the items 120 and the interconnections between the items 120. As such, the graph that is generated may include nodes (or vertices, V) corresponding to the items 120 that are to be presented (which may be a subset of the entire repository of items 120), and edges between pairs of the nodes. The graph may be an undirected graph having an undirected edge between each unique pair of nodes in the graph, which creates a "clique" or a complete graph. Turning briefly to FIG. 4, an example of such a clique is shown as the graph 400 in FIG. 4. The graph 400 includes 4 nodes 402(1)-(4) and a plurality of edges that connect each unique pair of nodes 402. The total number of edges in any clique, such the graph 400, is $V*(V-1)/2$, where V denotes the number of nodes/vertices in the graph 400. In this example, there are 4 nodes and 6 edges in the graph 400 (i.e., # of edges=$4*(4-1)/2$=6). The graph 400 may be generated in quadratic time, or it may be generated in polynomial time and space using an edge incidence matrix, such as the edge incidence matrix 404 shown in FIG. 4. As noted above, it is to be appreciated that the item ranking module 126 may operate in the absence of creating a graph, such that the graph generator 308 is understood to be an optional component. For example, the system may generate incompatibility scores for individual pairs of items 120 and associate those scores with the item pairings in other types of data structure or representations to determine an order of a plurality of items 120 that minimizes the sum of the incompatibility scores associated with sequential pairs of the items 120.

Referring again to FIG. 3, the item ranking module 126 may further include the incompatibility scoring module 130 (introduced in FIG. 1) configured to determine an incompatibility score associated with any given pair of items 120 based on the machine learning model 128. That is, the incompatibility score generated by the incompatibility scoring module 130 may be based on learned output from the machine learning model 128, and the incompatibility score may indicate a degree of incompatibility between any two items 120, when they are paired together. In some instances, the incompatibility score may be implemented as a binary score (e.g., 0 or 1) to indicate whether a pairing is incompatible or compatible. Alternatively, there may be an "incompatibility spectrum" (i.e., a range or scale of incompatibility scores) that may be assigned to any given item pairing in order to attribute different levels of incompatibility to different item pairings. The scale of possible incompatibility scores (i.e., how high of a number to attribute to an incompatible item pairing) may be tunable/configurable depending on the degree to which the system wants to "punish" incompatibility, and/or how much the system wants to "reward" item relevance. In some embodiments, the incompatibility scores generated by the incompatibility scoring module 130 may be of a magnitude that is on the order of 1000 (e.g., powers of $10^3$). In some embodiments, the magnitude of the incompatibility scores may be much smaller, such as on the order of 10 (e.g., powers of 10). In some embodiments, the magnitude of the incompatibility scores may be commensurate to the magnitude of the relevance scores generated by the relevance scoring module 306. The tradeoff for attributing different scales or weights to the incompatibility score may be analogized to the "precision vs. recall" tradeoff that is familiar in the design of search engines. With this in mind, it is appreciated that punishing incompatibility too much may result in compromising on the relevance of the items 120 that are ultimately presented to the customer 102.

Referring again to FIG. 4, both the relevance score and the incompatibility score are shown with reference to an original relevance ranking 406 of four items 120(1), 120(2), 120(3), and 120(4), which are also denoted as items "A", "B", "C", and "D", respectively. The ranked order, A-B-C-D, may be based on the relevance metrics such that item 120(1) (i.e., item "A") is deemed the most relevant item 120 in a ranked list of items and item 120(4) (i.e., item "D") is perhaps the least relevant item 120 among those shown in the example of FIG. 4. It is to be appreciated that, although only four items 120 are shown in this example, any number of items 120 may be evaluated for ranking, and in practice, many more items (e.g., on the order of hundreds, thousands, etc.) may be evaluated in this manner.

The relevance metrics for each item 120 that result in the ordered ranking in the original relevance ranking 406 may be converted to relevance scores 408 (sometimes referred to as "original relevance scores 408") that are attributed or assigned to the edges between each of the ranked items 120. In this example, a lower relevance score for an edge is "better" in terms of achieving a higher rank. Thus, by ordering the edges by their relevance scores 408, the ranked order A-B-C-D by relevance may be maintained/preserved. FIG. 4 also shows incompatibility scores 410 assigned to the edges between adjacent items in the original relevance ranking 406. In the example of FIG. 4, items 120(3) and 120(4) are considered to be incompatible when paired together, as indicated by the incompatibility score of "1000" that is assigned to the edge that connects items 120(3) and 120(4) together. For example, the item 120(3) may correspond to a food-related item (e.g., a sandwich from a particular restaurant), and the item 120(4) may correspond to an item for a toe fungus removal product/service. In addition, the example of FIG. 4 indicates that no other item pairings (in the original relevance ranking 406) are incompatible, as indicated by the incompatibility scores of "0" for the other item pairings in the original relevance ranking 406.

The relevance scores 408 and the incompatibility scores 410 shown in FIG. 4 may be generated by the relevance scoring module 306 and the incompatibility scoring module 130, respectively. The two scores 408 and 410 may be mathematically combined to obtain an overall score 412 that is assigned to an edge between any two items 120. For instance, FIG. 4 illustrates that the relevance score 408 may be summed with the incompatibility score 410 to obtain the overall score 412 for a particular edge. However, other methods may be implemented for calculating the overall score 412, such as by taking a ratio of the incompatibility score 410 to the relevance score 408

$$\left(\text{e.g., a ratio of } \frac{\text{incompatibility score}}{\text{relevance score}}\right),$$

subtracting the relevance score 408 from the incompatibility score 410, and so on.

In some embodiments, the score 412 for a respective edge may include the relevance score 408, the incompatibility score 410, or a mathematical combination of both scores. In some embodiments, the incompatibility score 410 may be compared to a threshold incompatibility score, and if the incompatibility score 410 meets or exceeds the threshold incompatibility score, the overall score 412 includes the incompatibility score 410 (e.g., the sum of the incompatibility score 410 and the relevance score 408). However, if the incompatibility score 410 is below the threshold incompatibility score, the incompatibility score 410 may be omitted from the overall score 412, such that the overall score comprises the relevance score 408 by itself. Regardless of how the overall score 412 is determined, each undirected edge of the graph 400 may be assigned a score, such as the score 412, so that each unique item pairing is assigned a score.

Referring again to FIG. 3, the item ranking module 126 may further include matrix generator 310 configured to generate an edge incidence matrix, such as the edge incidence matrix 404 shown in FIG. 4. The edge incidence matrix 404 corresponds to the graph 400 generated by the graph generator 308. The edge incidence matrix 404 may include a plurality of cells that contain the scores 412, which may be based on the relevance scores 408 and the incompatibility scores 410.

In some implementations, the scores contained in each cell of the edge incidence matrix 404 may be compared to a threshold score to determine whether to apply a "residual incompatibility" score to other cells in the edge incidence matrix 404. This may be characterized as a reinforcement learning technique to "pass along" discounted incompatibility to neighboring cells, which may improve the effectiveness of the algorithm for eliminating, or at least reducing the occurrence of, incompatible item pairings. For example, FIG. 4 shows the cell corresponding to edge "C-D" receiving a score of 1003, which may be above some predetermined threshold score. When the score "1003" meets or exceeds the threshold score, the cells in the edge incidence matrix 404 that are adjacent to the cell with the score of 1003 (adjacent neighboring cells) may be assigned a "discounted incompatibility score." The discounted incompatibility score may be based on a predetermined fraction or percentage of the incompatibility score 410 (or of the overall score 412) associated with the cell containing the score that meets or exceeds the threshold score (in this example, the score of "1003"), and this discounted incompatibility score is passed to neighboring cells corresponding to edges in the graph 400. FIG. 4 illustrates this technique in that the cells corresponding to the edges "B-D" and "B-C" are assigned a discounted incompatibility score of 500 (e.g., 50% of 1000), and this may be gradually discounted for neighboring cells of those cells, such as the cell corresponding to edge "A-D", which is assigned a discounted incompatibility score of 50 (e.g., 5% of 1000), and so on. Any suitable discount rate may be used to propagate "residual incompatibility" to neighboring cells. For example, the discounted incompatibility score may decrease according to a predetermined constant factor, exponentially, logarithmically, and so on, as the discounted incompatibility score propagates to farther away neighboring cells in the edge incidence matrix 404.

The above-described reinforcement learning technique of propagating discounted incompatibility scores to neighboring cells may achieve greater separation between incompatible item pairings as compared to assigning the scores 412 to each cell without further modification to the scores. In some embodiments, passing along discounted incompatibility to neighboring cells of the edge incidence matrix 404 may be reserved for instances where the number of items/nodes in the graph 400 is below some threshold number (i.e., a relatively small number of items). This may be based on the notion that a smaller list of items 120 affords fewer options for sufficiently eliminating, or at least reducing the occurrence of, incompatible item pairings.

Referring again to FIG. 3, the item ranking module 126 may further include the minimum spanning tree (MST) module 132 (introduced in FIG. 1) configured to execute a MST algorithm to find a minimum spanning tree (which may be non-unique) in the graph 400. A "spanning tree" of a graph 400 is a sub-graph comprising a tree that connects all of the nodes 402 in the graph 400 together. A single graph 400 can have many different spanning trees. A minimum spanning tree can be computed in polynomial time, and represents the minimum overall score (from summing the scores for all of the edges of the graph 400) given multiple evaluated "in order" traversals (or tours) of the graph 400 that visits each node 402. In other words, a minimum spanning tree is a spanning tree with an overall score from a traversal of the graph 400 that is less than or equal to the overall scores from traversals of the graph 400 of every other spanning tree.

FIG. 4 illustrates multiple example tours 414(1)-(Q) (collectively 414) or traversals of the graph 400 that may correspond to spanning trees of the graph 400. Each traversal 414 is classified by the order in which the nodes 402 are visited during the traversal 414. To perform a traversal of the graph 400, the MST module 132 may select a starting node 402 in the graph 400 to be either end of the spanning tree and performs an "in order" traversal of the graph 400, visiting all nodes 402 at least once (i.e., a node 402 may be visited more than once), and may compute an overall spanning tree score as the sum of all of the scores for each traversed edge in the graph 400. These traversals 414 (or spanning trees) may be evaluated by the MST module 132 to find a minimum spanning tree. In the example of FIG. 4, assuming that the item pairing of items "C" and "D" is an incompatible item pairing, tour 1 achieves no separation between items "C" and "D". By contrast, both tour 2 and tour Q achieve some level of separation between C and D. In some embodiments, duplicative or repeated nodes (e.g., repeated node "A" in tour 2) may be removed or deleted from the traversals 414, or repeated nodes may be substituted with another node in the tree that occurs later.

Once a minimum spanning tree is found, the MST module 132 outputs the minimum spanning tree 416, as shown in FIG. 4. Subsequently, the item ranking module 126 may rank the plurality of items 120 under consideration based on the minimum spanning tree 416 by listing the items 120 starting at either end of the minimum spanning tree. It is to be appreciated that, in the minimum spanning tree 416, paths to incompatible item pairings will be completely avoided, where possible. That is, if there is some lower weighted path between to nodes 402 that are deemed incompatible when paired together, it will be taken first before the edge between the incompatible nodes 402 is considered. In other words, there will be some nodes 402 in between the two incompatible nodes 402. In practice, with a potentially large list of items (e.g., hundreds, thousands, or more), many nodes 402 will appear in between two incompatible items 120 in the minimum spanning tree 416, and many less-offensive item pairings will be presented before an incompatible item pairing is presented. Furthermore, it is contemplated that high incompatibility scores 410 will be sparse in many implementations because it is more likely that item pairings will be compatible than incompatible. Thus, the minimum spanning tree 416 is expected to result in an item ranking that efficiently and effectively eliminates, or at least reduces the occurrence of, incompatible item pairings. In situations where there is a high percentage of incompatible item pairings in a set of items 120, or when there are a small number of items 120 under consideration and at least some of the item pairings are incompatible, further optimization techniques may be utilized to improve the elimination or reduction of incompatible item pairings.

Accordingly, FIG. 3 further illustrates that the item ranking module 126 may include an optimization module 312 configured to optimize the ranking that results from the output of the MST module 132. The output of the MST module 312 may be sufficient in many cases, but optimization may be desire, or may result in improvements in regards to eliminating or reducing incompatible item pairings. In these scenarios, the optimization module 312 may be used to further separate incompatible item pairings. In some embodiments, the optimization module 312 may use a "re-ordering" technique to re-order the list of items 120 output by the MST module 132, so long as the re-ordering does not increase the overall score associated with the minimum spanning tree 416. That is, if the ordering can be improved without doing worse than the minimum spanning tree 416, then the optimization module 312 can be used to accomplish such an improvement in the final ranking.

In some embodiments, the optimization module 312 takes the ordering of nodes 402 output by the MST module 132 and selects a first pair of nodes 402, starting at the beginning or the end of the ranked list, and may replace or swap the edge between the first pair of nodes 402 with an edge between a second pair of nodes in the minimum spanning tree 416 that has a relatively high score associated therewith. This "swap" or "replacement" may be performed so long as the resulting score associated with the minimum spanning tree 416 does not increase. Furthermore, this "swapping" maneuver can be iterated until the overall score of the ranking does not improve anymore, or until a threshold number of iterations is reached, and so on. This swapping operation, although greedy, may refine the ranking order. However, the optimization may not produce an optimal ranking, especially in cases where there are many incompatible item pairings and many "gradations" of incompatible item pairings. Because there are n! ways of organizing nodes, and a brute-force algorithm to swap all of them with no constraints is intractable.

If more constraints are induced, other search algorithms, such as an A* algorithm, an iterative deepening algorithm, and similar algorithms, may produce more optimal spanning trees. That is, the re-ordering of ranked items 120 output by the MST module 132 may be accomplished by executing an A* algorithm on the graph 400, which may result in the number of different orderings of the nodes 402 being on the order of $1.00x^n$, which is a much more manageable number of node orderings for consideration, as compared to n! orderings. The number of combinations are also greatly reduced by considering other minimum spanning trees in the search space before any re-ordering optimization is performed by the optimization module 312. In some embodiments, nodes from outside the graph 400 may be retrieved and inserted into the item ranking to add an even greater buffer between incompatible item pairings than would otherwise be achieved be swapping/re-ordering nodes. For example, related items 120, promotions, etc., that are in-context of the items 120 in the list, might be retrieved from outside of the graph 400 and substituted between items 120 by the optimization module 312.

It is to be appreciated that the maximum amount by which any two items 120 can be separated is n−2 nodes between them, where "n" is the number of nodes 402 in the graph 400. This would result in two incompatible items being placed at opposite ends of the ranked list with every other node 402 in between them. Thus, the optimization module 312 may be constrained by the number of items 120 (i.e., nodes 402) that is has to work with.

Referring again to FIG. 3, the memory 114 is shown as further including a behavior module 314 configured to track or otherwise monitor behaviors (e.g., views, clicks, or other detectable user input) and to cause storage of the tracked behavior data in the training data 302 so that the tracked behavior data can be used to re-train or update the machine learning model 128. In this manner, the customer behavior can be continuously monitored by the behavior module 314 and recorded to improve the machine learning model 128 in terms of accuracy in ranking items 120. For example, "glance view conversions" (e.g., a customer viewed a presentation of items, such as a list of deals 204, and subsequently purchased one of the items 120 in the presented list) may be monitored to track how customers 102 react to different item rankings.

In some embodiments, each item ranking that is output by the item ranking module 126 may be stored in the memory 114, and each of those stored item rankings may be segmented into a subset of the items 120 that are within a fixed distance of each other (e.g., 3 or 4 consecutive items, which may correspond to a subset of items 120 that were viewed in a single screen rendering by the customer 102). These subsets of items 120 may then be added to the training data 302 so that the subsets can be analyzed to find positive associations and negative associations among the subsets of items 120 using any suitable algorithm, such as an a priori algorithm.

The processes described herein are each illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 5:
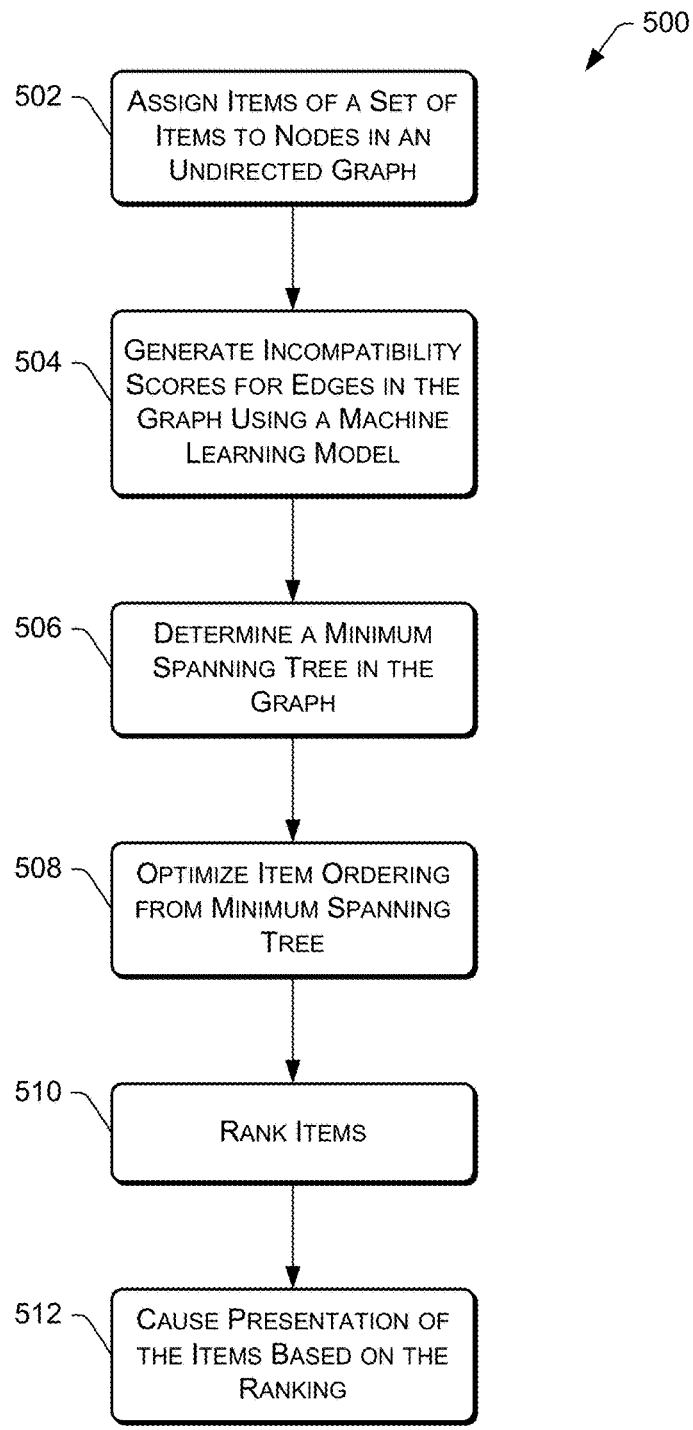
FIG. 5 is a flow diagram of an illustrative process for ranking a plurality of items in a manner that eliminates, or at least reduces an occurrence of, incompatible item pairings.

FIG. 5 is a flow diagram of an illustrative process 500 for ranking a plurality of items 120 in a manner that eliminates, or at least reduces the occurrence of, incompatible item pairings. For discussion purposes, the process 500 is described with reference to the environment 100 of FIG. 1, and the system of FIG. 3. In particular, many acts described below may be implemented and performed by the item ranking module 126, including the graph generator 308, the incompatibility scoring module 130 and the MST module 132.

At 502, the graph generator 308 may assign individual items 120 of a plurality of items 120 to nodes 402 in a graph, such as the graph 400. The graph 400 may include an undirected edge between pairs of nodes 402 in the graph 400. In some embodiments, each item 120 in a set of items 120 under evaluation is assigned to a node 402, and the graph 400 includes an undirected edge between each unique pair of nodes 402 such that the graph 400 comprises a clique, or a "complete" graph. In some embodiments, step 502 may be omitted where a graph 400 is not utilized for elimination of incompatible item pairings.

At 504, the incompatibility scoring module 130 may generate, using a machine learning model 128, incompatibility scores 410 for individual undirected edges of the graph 400 to indicate a degree of incompatibility between respective pairs of items 120 associated with the nodes 402 that are connected by the individual undirected edges. In some embodiments, the incompatibility scores 410 generated at 504 are used to calculate a final score 412 that is assigned to an edge in the graph (e.g., by summing the incompatibility score 410 with the relevance score 408 for an edge, taking a ratio of the incompatibility score 410 to the relevance score 408, etc.). In other embodiments, the incompatibility score 410 generated at 504 may be compared to a threshold and used in a final score for the edge in those instances where the incompatibility score 410 meets or exceeds the threshold. In any case, the incompatibility score 410 generated at 504 may be evaluated to determine the level of incompatibility between a given pair of items 120 in the graph 400. As noted above, the item ranking module 126 may operate in the absence of creating a graph, such that step 504 may involve generating incompatibility scores for individual pairs of items 120 and associating those scores with the item pairings in other non-graph data representations.

At 506, the MST module 132 may determine a minimum spanning tree 416 in the graph 400 based at least in part on the incompatibility scores 410. For example, the incompatibility scores 410 may make up at least a portion of the final score 412 assigned to each edge of the graph 400, and multiple spanning trees may be evaluated by performing different in-order traversals of the graph 400 and summing the scores of the edges for those traversals to determine a minimum spanning tree 416 for the graph 400. In some embodiments, the MST module 132 may determine, at step 506, an order of a plurality of items 120 that minimizes the sum of the incompatibility scores associated with sequential pairs of the items 120 without operating on a graph, such as when other non-graph data representations are implemented.

At 508, an optional optimization step may be performed using the optimization module 312. The optimization at 508 may include re-ordering the items 120 under evaluation by swapping edges within the minimum spanning tree 416. For example, the optimization module 312 may takes the output of the MST module 132 from step 506 and selects a first pair of nodes 402, starting at the beginning or the end of the minimum spanning tree 416, and may swap the edge between the first pair of nodes 402 with an edge in the minimum spanning tree 416 that has a relatively high score associated therewith. This "swap" may be performed so long as the resulting score associated with the minimum spanning tree 416 does not increase, and the "swapping" maneuver can be repeated for some number of iterations, such as until the overall score of the ranking does not improve anymore, or until a threshold number of iterations is reached, and so on. In some the optimization at 508 may include re-ordering the items 120 under evaluation using an A* algorithm, iterative deepening, or a similar algorithm.

At 510, the item ranking module 126 may rank the plurality of items based at least in part on the minimum spanning tree 416. For example, the items 120 may be ranked in order, starting from either end of the minimum spanning tree 416. In some embodiments, any repeated nodes 402 in the minimum spanning tree 416 may be removed/deleted, or substituted with replacement nodes 402 prior to ranking at 510. In implementations where the optimization is performed at step 508, the ranking at 510 may be further based on the output of the optimization module 312.

At 512, the user interface manager 116, via the item presentation module 300, may cause presentation of the plurality of items 120 based at least in part on the ranking output by the item ranking module 126. The process 500 may result in an ordering of the items 120 that eliminates, or at least reduces the occurrence of, incompatible item pairings, such as an item pairing of a food-related item with an item related to a toe fungus removal product, and may result in a presentation of items such as the deals 204 presented via the user interface 202 of FIG. 2.

Figure 6:
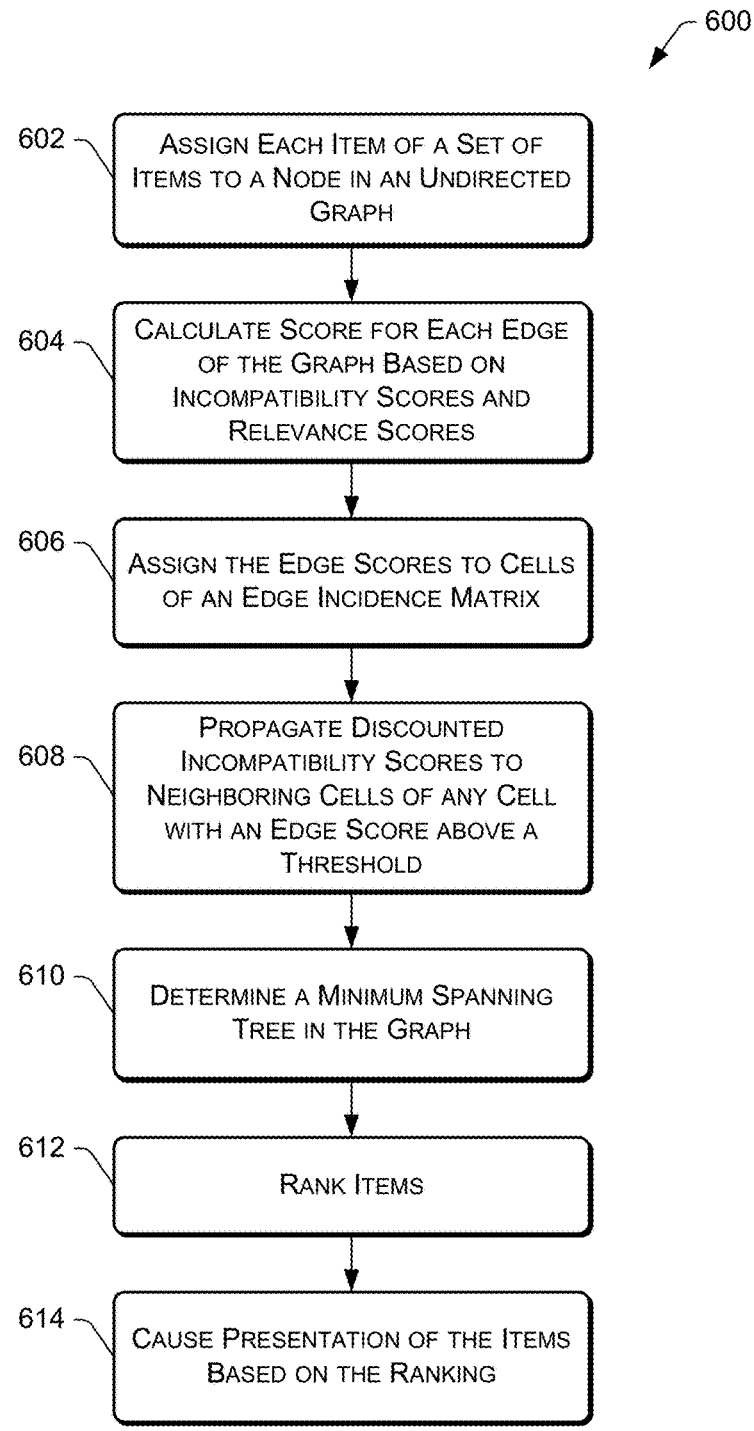
FIG. 6 is a flow diagram of a more detailed illustrative process for ranking a plurality of items in a manner that eliminates, or at least reduces an occurrence of, incompatible item pairings.

FIG. 6 is a flow diagram of a more detailed illustrative process 600 for ranking a plurality of items 120 in a manner that eliminates or reduces incompatible item pairings. For discussion purposes, the process 600 is described with reference to the environment 100 of FIG. 1, and the system of FIG. 3. In particular, many acts described below may be implemented and performed by the item ranking module 126, including the relevance scoring module 306, the graph generator 308, the incompatibility scoring module 130, the matrix generator 310, and the MST module 132.

At 602, the graph generator 308 may assign each item 120 of a plurality of items 120 to a node 402 in a graph, such as the graph 400. At 604, a score 412 may be calculated for each undirected edge of the graph 400. The score 412 calculated at 604 may be based on machine learned relevance scores 408 and incompatibility scores 410 that are generated by the relevance scoring module 306 and the incompatibility scoring module 130. In some embodiments, the score at 604 may comprise a sum or a ratio of the incompatibility score 410 and the relevance score 408 for each edge of the graph 400. In other embodiments, the incompatibility score 410 may be compared to a threshold incompatibility score, and if below the threshold, the score at 604 may comprise the relevance score 408.

At 606, the matrix generator 310 may generate an edge incidence matrix 404, and may assign the scores generated at 604 to the cells of the edge incidence matrix 404. At 608, for any cell containing a score that meets or exceeds a threshold (or for any score including an incompatibility score 410 that meets or exceeds a threshold), the score of that cell may be discounted and propagated to neighboring cells in the edge incidence matrix 404. In other words, the incompatibility score 410 of a particular cell may be imputed to neighboring cells in a discounted amount in order to achieve better separation between incompatible items.

At 610, the MST module 132 may determine a minimum spanning tree 416 in the graph 400 based at least in part on the edge scores of the edge incidence matrix 404. At 612, the item ranking module 126 may rank the plurality of items based at least in part on the minimum spanning tree 416. At 614, the user interface manager 116, via the item presentation module 300, may cause presentation of the plurality of items 120 based at least in part on the ranking output by the item ranking module 126.

Figure 7:
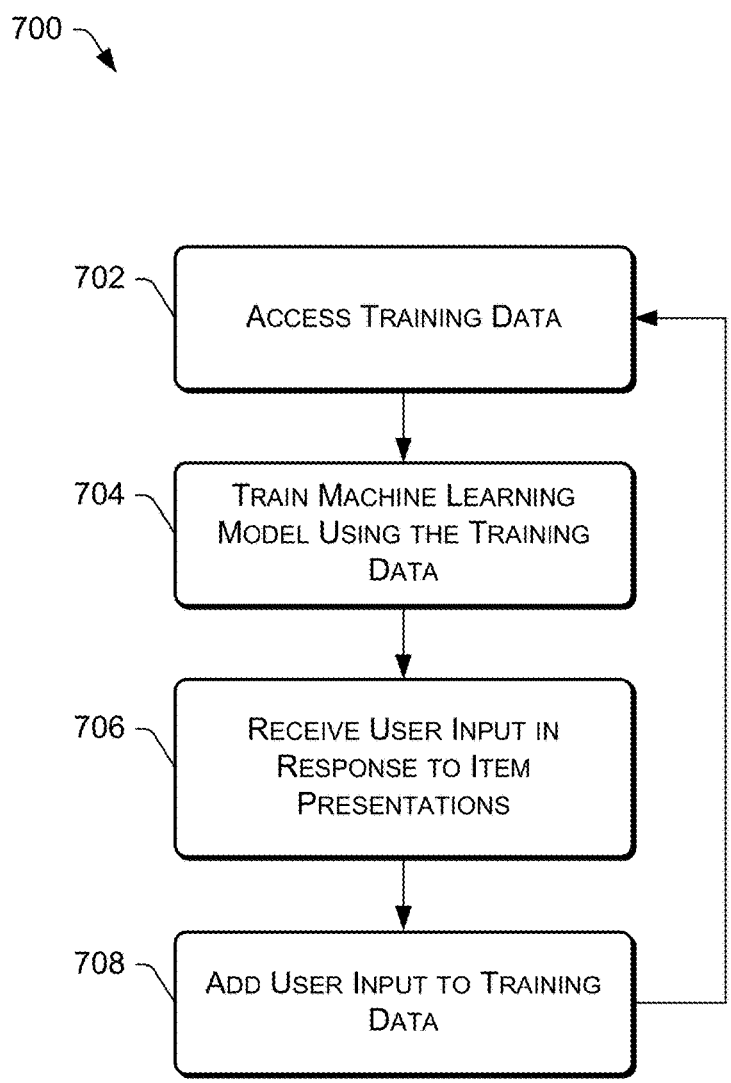
FIG. 7 is a flow diagram of an illustrative process for training a machine learning model that is configured to, among other things, return incompatibility scores for item pairings.

FIG. 7 is a flow diagram of an illustrative process 700 for training a machine learning model 128 that is configured to, among other things, return incompatibility scores 410 for item pairings. For discussion purposes, the process 700 is described with reference to the environment 100 of FIG. 1, and the system of FIG. 3. In particular, many acts described below may be implemented and performed by the machine learning training component 304 and the behavior module 314.

At 702, the machine learning training component 304 may access the training data 302 that is available in the memory 114 of the server(s) 106. The training data 302 may include any suitable item-related data, such as item attributes 122, and the training data 302 may be in the form of text-based data (e.g., words, tokens, textual descriptions, etc.), image-based data, and so on. The training data 302 may be labeled with an incompatibility metric as part of a supervised machine learning approach.

At 704, the machine learning training component 304 may train the machine learning model 128 using the training data 302. As described above, the machine learning model 128 may be configured relevance scores 408, incompatibility scores 410, and perhaps other scores or classification metrics from processing various inputs and signals learned from the training data 302. Any suitable machine learning technique described herein may be used to train the machine learning model 128 at step 704. For example, computer vision algorithms may be utilized on image data to train the machine learning model 128 using a combination of text-based data and image-based data.

At 706, once the item ranking module 126 is implemented for ranking items 120 using the machine learning model 128, the behavior module 314 may receive user input (e.g., webpage navigation, mobile application navigation, "clicks" (e.g., mouse clicks, touch events, etc.), and other observable behaviors) indicative of a particular behavior, such as a conversion or engagement behavior. For example, the monitored behavior may indicate that the customer 102 purchased a deal 204 pertaining to a particular item 120 of a set of items 120 were presented in a particular manner. In this manner, positive and negative correlations between particular item presentations may be identified based on monitored user behavior.

At 708, the behavior module 314 may add information characterizing the received user input to the training data 302. Once added, the process 700 iterates to re-train the machine learning model 128 using the updated training data 302 having the information relating to the received user input. In this manner, the machine learning model 128 may be constantly improved in response to tracked customer behavior to learn from customer reactions to the item presentations provided to the customer 102.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that, when executed, cause one or more processors to perform acts comprising:
    identifying a plurality of image representations to be presented on a display associated with a computing device;
    analyzing, at least partly using a computer-vision processing technique, the plurality of the image representations to identify respective objects depicted in each of the plurality of the image representations;
    ranking the plurality of image representations in a first ranked order according to relevance of individual image representations of the plurality of image representations to a known customer preference or to a search query submitted via the computing device;
    assigning each image representation of the plurality of image representations to a node in a graph, the graph including an undirected edge between each unique pair of nodes in the graph;
    training a machine-learning model to generate incompatibility scores that indicate degrees of incompatibility between objects depicted in image representations;
    generating, at least partly using the machine-learning model, incompatibility scores for each undirected edge of the graph, wherein the incompatibility scores indicate a degree of incompatibility between respective pairs of the objects depicted in the plurality of image representations that are associated with nodes that are connected by respective undirected edges;
    assigning a score to each undirected edge of the graph, the score comprising at least one of a sum or a ratio of: (i) an incompatibility score for the undirected edge and (ii) an original relevance score for the undirected edge, wherein the first ranked order is determined based on an ordering the undirected edges of the graph from lowest original relevance score to highest original relevance score;
    determining a minimum spanning tree in the graph based at least in part on the score assigned to each undirected edge;
    ranking the plurality of image representations in a second ranked order based at least in part on the minimum spanning tree; and
    causing the computing device to present, via the display, the plurality of image representations according to the second ranked order.

2. The one or more non-transitory computer-readable media of claim 1, wherein generating the incompatibility scores for each undirected edge of the graph further comprises:
    generating an edge incidence matrix having a plurality of cells, wherein the incompatibility scores are assigned to respective ones of the plurality of cells;
    determining that a cell of the plurality of cells in the edge incidence matrix is assigned an incompatibility score that is above a threshold score;
    propagating discounted incompatibility scores to neighboring cells that are adjacent to the cell in the edge incidence matrix; and
    assigning the discounted incompatibility scores to undirected edges of the graph that are associated with the neighboring cells of the edge incidence matrix.

3. The one or more non-transitory computer-readable media of claim 1, wherein the acts further comprise:
    determining a total score associated with the minimum spanning tree as a sum of the scores assigned to the undirected edges that constitute the minimum spanning tree; and
    re-ordering the plurality of image representations in a third ranked order by replacing a first undirected edge of the minimum spanning tree with a second undirected edge of the minimum spanning tree provided that the total score does not increase as a result of the re-ordering.

4. The one or more non-transitory computer-readable media of claim 1, the acts further comprising:
    obtaining training data to train the machine-learning model, wherein the training data includes training incompatibility scores associated with respective pairs of training image representations that depict objects, and wherein training the machine-learning model comprises executing a machine-learning algorithm to train the machine-learning model using the training data, wherein the machine-learning algorithm uses the training data to train the machine-learning model to generate incompatibility scores for pairs of received image representations.

5. A method comprising:

analyzing, by at least one of one or more computing devices and at least partly using a computer-vision processing technique, a plurality of image representations to identify respective objects depicted in each of the plurality of image representations;

training, by at least one of the one or more computing devices, a machine-learning model to generate incompatibility scores that indicate degrees of incompatibility between objects depicted in image representations;

generating, by at least one of the one or more computing devices and using the machine-learning model, incompatibility scores for individual pairs of the respective objects depicted in the plurality of image representations to indicate a degree of incompatibility between respective pairs of the plurality of image representations;

ranking, by at least one of the one or more computing devices, the plurality of image representations in an ordered list that minimizes a sum of the incompatibility scores associated with sequential pairs of the image representations in the ordered list; and causing presentation of the plurality of image representations based at least in part on the ranking.

6. The method of claim 5, further comprising, prior to generating the incompatibility scores:

assigning individual image representations of the plurality of image representations to nodes in a graph, the graph including an undirected edge between pairs of nodes in the graph;

wherein generating the incompatibility scores comprises generating the incompatibility scores for individual undirected edges of the graph, the method further comprising:

determining a minimum spanning tree in the graph based at least in part on the incompatibility scores, wherein the plurality of image representations is ranked based at least in part on the minimum spanning tree.

7. The method of claim 6, further comprising, prior to ranking the plurality of image representations based at least in part on the minimum spanning tree:

ranking the plurality of image representations according to relevance of individual image representations of the plurality of image representations to a known customer preference or to a received search query to obtain a ranked list of the plurality of image representations;

assigning original relevance scores to each undirected edge of the graph such that ordering the undirected edges of the graph from lowest original relevance score to highest original relevance score results in the ranked list of the plurality of image representations; and assigning a score to each undirected edge of the graph, the score comprising a sum or a ratio of an incompatibility score for the undirected edge and an original relevance score for the undirected edge, wherein the determining the minimum spanning tree is further based on the score assigned to each undirected edge of the graph.

8. The method of claim 7, further comprising:

determining a total score associated with the minimum spanning tree based at least in part on the score assigned to each undirected edge that is traversed in the minimum spanning tree; and re-ordering the plurality of image representations by replacing a first undirected edge of the minimum spanning tree with a second undirected edge of the minimum spanning tree provided that the total score does not increase as a result of the re-ordering.

9. The method of claim 8, further comprising repeating the re-ordering until it is determined that further re-ordering will not result in improving the total score or until a number of iterations of the re-ordering meets or exceeds a threshold number of iterations.

10. The method of claim 7, further comprising:

determining a total score associated with the minimum spanning tree based at least in part on the score assigned to each undirected edge that is traversed in the minimum spanning tree; and re-ordering the plurality of image representations by executing an A* algorithm on the graph.

11. The method of claim 6, further comprising, prior to ranking the plurality of image representations based at least in part on the minimum spanning tree:

ranking the plurality of image representations according to relevance of the plurality of image representations to a known customer preference or to a received search query to obtain a ranked list of the plurality of image representations;

assigning original relevance scores to each undirected edge of the graph such that ordering the undirected edges of the graph from lowest original relevance score to highest original relevance score results in the ranked list of the plurality of image representations;

comparing each of the incompatibility scores to a threshold score;

for a first undirected edge associated with a first incompatibility score that meets or exceeds the threshold score, assigning a first score to the first undirected edge of the graph, the first score comprising a sum or a ratio of the first incompatibility score for the first undirected edge and a first original relevance score for the undirected edge; and for a second undirected edge associated with a second incompatibility score that is below the threshold score, assigning a second score to the second undirected edge of the graph, the second score comprising a second original relevance score for the second undirected edge;

wherein the determining the minimum spanning tree is further based on the first scores and the second scores assigned to undirected edges of the graph.

12. The method of claim 6, further comprising removing duplicative nodes from the minimum spanning tree prior to ranking the plurality of image representations based at least in part on the minimum spanning tree.

13. The method of claim 5, wherein training the machine-learning model comprises training the machine learning model using a combination of image representations and text-based training data.

14. A system comprising:
one or more processors;
memory; and one or more modules stored in the memory and executable by the one or more processors to perform operations comprising:
  analyzing, at least partly using a computer-vision processing technique, a plurality of image representations to identify respective objects depicted in each of the plurality of image representations;
  training a machine-learning model to generate incompatibility scores that indicate degrees of incompatibility between the objects depicted in each of the plurality of image representations;
  assigning individual image representations of the plurality of image representations to nodes in a graph, the graph including an undirected edge between pairs of nodes in the graph;
  generating, using the machine-learning model, incompatibility scores for individual undirected edges of the graph to indicate a degree of incompatibility between respective pairs of the image representations associated with nodes that are connected by the individual undirected edges;
  determining a minimum spanning tree in the graph based at least in part on the incompatibility scores;
  ranking the plurality of image representations in an ordered list that minimizes a sum of incompatibility scores associated with sequential pairs of the plurality of image representations in the ordered list; and
  causing presentation of the plurality of image representations based at least in part on the ranking.

15. The system of claim 14, wherein the one or more modules are further executable by the one or more processors to:
  generate an edge incidence matrix having a plurality of cells, wherein the incompatibility scores are to be assigned to respective ones of the plurality of cells;
  determine that a cell in the edge incidence matrix is assigned an incompatibility score that is above a threshold score;
  propagate discounted incompatibility scores to neighboring cells that are adjacent to the cell in the edge incidence matrix; and
  assign the discounted incompatibility scores to undirected edges of the graph that are associated with the neighboring cells of the edge incidence matrix.

16. The system of claim 14, wherein the one or more modules are further executable by the one or more processors to:
  prior to ranking the plurality of image representations based at least in part on the minimum spanning tree, rank the plurality of image representations according to relevance of the plurality of image representations to a known customer preference or to a received search query to obtain a ranked list of the plurality of image representations;
  assign original relevance scores to each undirected edge of the graph such that ordering the undirected edges of the graph from lowest original relevance score to highest original relevance score results in the ranked list of the plurality of image representations;
  assign a score to each undirected edge of the graph, the score comprising a sum or a ratio of an incompatibility score for the undirected edge and an original relevance score for the undirected edge; and
  determine the minimum spanning tree based on the score assigned to each undirected edge of the graph.

17. The system of claim 16, wherein the one or modules are further executable by the one or more processors to:
  determine a total score associated with the minimum spanning tree based at least in part on the score assigned to each undirected edge that is traversed in the minimum spanning tree; and
  re-order the plurality of image representations by replacing a first undirected edge of the minimum spanning tree with a second undirected edge of the minimum spanning tree provided that the total score does not increase as a result of re-ordering the plurality of image representations.

18. The system of claim 17, wherein the one or more modules are further executable by the one or more processors to iteratively re-order the plurality of image representations until a determination that further re-ordering will not result in improving the total score or until a number of iterations of the re-ordering meets or exceeds a threshold number of iterations.

19. The system of claim 14, wherein the one or more modules are further executable by the one or more processors to:
  prior to ranking the plurality of image representations based at least in part on the minimum spanning tree, rank the plurality of image representations according to relevance of the plurality of image representations to a known customer preference or to a received search query to obtain a ranked list of the plurality of image representations;
  assign original relevance scores to each undirected edge of the graph such that ordering the undirected edges of the graph from lowest original relevance score to highest original relevance score results in the ranked list of the plurality of image representations;
  compare each of the incompatibility scores to a threshold score;
  for a first undirected edge associated with a first incompatibility score that meets or exceeds the threshold score, assign a first score to the first undirected edge of the graph, the first score comprising a sum or a ratio of the first incompatibility score for the first undirected edge and a first original relevance score for the first undirected edge;
  for a second undirected edge associated with a second incompatibility score that is below the threshold score, assign a second score to the second undirected edge of the graph, the second score comprising a second original relevance score for the second undirected edge; and
  determine the minimum spanning tree further based on the first scores and the second scores assigned to undirected edges of the graph.

20. The system of claim 14, wherein the presentation of the plurality of image representations is provided to a computing device associated with a customer, the one or modules further being executable by the one or more processors to:
  monitor a behavior of the customer in response to causing the presentation of the plurality of image representations; and
  retrain the machine learning model based at least in part on the behavior.

* * * * *